(12) United States Patent
Jain et al.

(10) Patent No.: US 11,963,029 B2
(45) Date of Patent: *Apr. 16, 2024

(54) METHOD AND APPARATUS FOR MEASURING SIGNALS ON A PLURALITY OF FREQUENCIES AT A MOBILE DEVICE (71) Applicant: QUALCOMM Incorporated, San Diego, CA (US)

(72) Inventors: Amit Jain, San Diego, CA (US); Akash Kumar, Hyderabad (IN); Govind Ram Venkat Narayan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 17/303,296

(22) Filed: May 26, 2021

(65) Prior Publication Data

US 2021/0289382 A1 Sep. 16, 2021

Related U.S. Application Data

(63) Continuation of application No. 15/956,507, filed on Apr. 18, 2018, now Pat. No. 11,051,194.

(51) Int. Cl.
*H04W 24/10* (2009.01)
*G01S 5/00* (2006.01)
(Continued)

(52) U.S. Cl.
CPC .......... *H04W 24/10* (2013.01); *G01S 5/011* (2020.05); *G01S 5/0244* (2020.05);
(Continued)

(58) Field of Classification Search
None
See application file for complete search history.

(56) References Cited

U.S. PATENT DOCUMENTS 8,805,423 B2   8/2014  Sridhara et al.
9,392,533 B1 *  7/2016  Vivanco ............... G01S 5/011
(Continued)

FOREIGN PATENT DOCUMENTS

WO   2013191969 A1   12/2013
WO   2015057746 A1    4/2015

OTHER PUBLICATIONS

LTE Positioning Protocol (LPP)—3GPP TS 36.355 v11.1.0 (Feb. 2013) (Year: 2013).*
(Continued)

*Primary Examiner* — Yemane Mesfin
*Assistant Examiner* — Jeff Banthrongsack
(74) *Attorney, Agent, or Firm* — Muncy, Geissler, Olds & Low, P.C.

(57) ABSTRACT

Techniques are provided which may be implemented using various methods and/or apparatuses in a mobile device to determine signal measurements on a plurality of frequencies and to provide signal measurements for position calculation on a location server or on the mobile device. Techniques are provided which may be implemented using various methods and/or apparatuses on a mobile device to concurrently scan for signals across two or more frequencies while optimizing sending and/or utilizing signal measurements made at higher frequency bands or signal measurements of signals sent from devices at a shorter range.

16 Claims, 5 Drawing Sheets

(51) Int. Cl.
*G01S 5/02* (2010.01)
*H04W 4/02* (2018.01)
*H04W 72/04* (2023.01)
*H04W 84/12* (2009.01)
*H04W 72/0453* (2023.01)
*H04W 76/15* (2018.01)

(52) U.S. Cl.
CPC ........ *H04W 4/025* (2013.01); *H04W 72/0453* (2013.01); *H04W 76/15* (2018.02); *H04W 84/12* (2013.01)

(56) References Cited

U.S. PATENT DOCUMENTS

| | | |
|---|---|---|
| 11,051,194 B2 | 6/2021 | Jain et al. |
| 2014/0323161 A1 | 10/2014 | Sridhara et al. |
| 2015/0105098 A1 | 4/2015 | Sridhara et al. |
| 2015/0327044 A1 | 11/2015 | Shah et al. |
| 2016/0037301 A1 | 2/2016 | Davydov et al. |
| 2017/0041899 A1 | 2/2017 | Venkatraman et al. |
| 2019/0208464 A1 | 7/2019 | Lee et al. |

OTHER PUBLICATIONS

International Search Report and Written Opinion—PCT/US2019/021755—ISA/EPO—dated Jul. 2, 2019.

* cited by examiner

METHOD AND APPARATUS FOR MEASURING SIGNALS ON A PLURALITY OF FREQUENCIES AT A MOBILE DEVICE

RELATED APPLICATIONS

This application is a continuation of U.S. application Ser. No. 15/956,507, filed Apr. 18, 2018, entitled "Method and Apparatus for Measuring Signals on a Plurality of Frequencies at a Mobile Device," which is assigned to the assignee hereof and incorporated herein by reference in its entirety.

BACKGROUND

1. Field

The subject matter disclosed herein relates to electronic devices, and more particularly to methods and apparatuses for use in or with a mobile device to determine signal measurements on a plurality of frequencies at a mobile device.

2. Information

Determination of the location of a mobile device may be based on measurements of terrestrial transceiver signals from wide area network (WAN) base stations, wireless local area network (WLAN) access points and from personal area network transceivers. As the types of WAN base stations, wireless LAN (WLAN) access points and personal area network transceivers increase, strategies to manage and optimize the use of multiple transceivers and to manage search for transceiver signals across multiple frequencies become more important to enable the optimization of hardware usage, search time, and network bandwidth as well as to improving the accuracy of location determination results.

SUMMARY

Some example techniques are presented herein which may be implemented in various method and apparatuses in a mobile device to determine signal measurements on a plurality of frequencies at a mobile device. In various embodiments, multiple WLAN transceivers in mobile devices may be used to measure signal parameters such as signal strength, time of arrival and/or time difference of arrival across multiple frequencies, for use in location determination. When multiple measurements are made across multiple frequencies, more accurate location be determined by prioritizing signal measurements based on frequency, distance, strength, multipath and other factors.

In accordance with an example implementation, a method may be provided which comprises, conducting a first plurality of scans within a first frequency band using a first WLAN transceiver in the mobile device; conducting a second plurality of scans within a second frequency band using the first WLAN transceiver in the mobile device; conducting a third plurality of scans within a third frequency band using a second WLAN transceiver in the mobile device; determining location information comprising indications of signal measurements measured within the first frequency band, indications of signal measurements measured within the second frequency band, or indications of signal measurements measured within the third frequency band, or a combination thereof; and sending the location information, from the mobile device to a location server, or determining a location of the mobile device using the location information or a combination thereof.

In accordance with another example implementation, an apparatus may be provided for use in a mobile device comprising: means for conducting a first plurality of scans within a first frequency band using a first WLAN transceiver in the mobile device; means for conducting a second plurality of scans within a second frequency band using the first WLAN transceiver in the mobile device; means for conducting a third plurality of scans within a third frequency band using a second WLAN transceiver in the mobile device; means for determining location information comprising indications of signal measurements measured within the first frequency band, indications of signal measurements measured within the second frequency band, or indications of signal measurements measured within the third frequency band, or a combination thereof; and means for sending the location information, from the mobile device to a location server, or determining a location of the mobile device using the location information or a combination thereof.

In accordance with yet another example implementation, a mobile device may be provided which comprises: one or more processing units; a first WLAN transceiver capable of operating at a first frequency and a second frequency; and a second WLAN transceiver capable of operating at a third frequency; wherein the one or more processing units are configured to: conduct a first plurality of scans within a first frequency band using a first WLAN transceiver in the mobile device; conduct a second plurality of scans within a second frequency band using the first WLAN transceiver in the mobile device; conduct a third plurality of scans within a third frequency band using a second WLAN transceiver in the mobile device; determine location information comprising indications of signal measurements measured within the first frequency band, indications of signal measurements measured within the second frequency band, or indications of signal measurements measured within the third frequency band, or a combination thereof; and send the location information, from the mobile device to a location server, or determining a location of the mobile device using the location information or a combination thereof.

In accordance with an example implementation, a non-transitory computer-readable medium, having stored thereon computer-readable instructions to cause a processor to: conduct a first plurality of scans within a first frequency band using a first WLAN transceiver in the mobile device; conduct a second plurality of scans within a second frequency band using the first WLAN transceiver in the mobile device; conduct a third plurality of scans within a third frequency band using a second WLAN transceiver in the mobile device; determine location information comprising indications of signal measurements measured within the first frequency band, indications of signal measurements measured within the second frequency band, or indications of signal measurements measured within the third frequency band, or a combination thereof; and send the location information, from the mobile device to a location server, or determining a location of the mobile device using the location information or a combination thereof.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Some example techniques are presented herein which may be implemented in various methods, means and apparatuses in a mobile device to measure and prioritize signals from a plurality of access points which utilize various 802.11 standards and associated frequencies. Signal measurements may be utilized to determine location, whether locally on the mobile device, or on a remote server such as a location server 160 or on a combination thereof. Example techniques presented herein address various methods and apparatuses in a mobile device to provide for or otherwise support sending probe requests for and prioritization of probe responses for 802.11 or other signals deployed across multiple frequency bands, where the probe responses are utilized to determine location, either on the mobile device or on a location server. Example techniques and embodiments are provided for measuring 802.11 signal characteristics, by a mobile device, for utilizing and/or sending those measurements to a location server and for determining a location of the mobile device either by the mobile device or by a location server using signal measurements made by the mobile device. The various embodiments described herein may also be applied to other air interfaces, particularly to those that support multiple disparate frequency bands, at least some of which have different effective communication, different detection ranges, different bandwidth requirements and/or differing scan times.

When determining location, nearby transmitters, all else (frequency, implementation, etc.) equal, are typically subject to less multipath and loss conditions and may provide more accurate ranges to be used for location determination. Therefore, in some embodiments, ranges measured, by the mobile device, to nearby transmitters may be prioritized over ranges measured, by the mobile device, to be utilized for location determination of the mobile device. In some embodiments, a location is desired within a predetermined threshold time. For example, either the mobile device 100 may be required to determine location within a threshold time, respond to a request within a threshold time or to forward range measurements to a location server 160 within a threshold time. If the threshold time is short, often, the most quickly detected transceivers, often those implemented at lower frequencies such as the 2.4 GHz band, may be the only ones available for use in ranging measurements and/or for utilization to calculate a location of the mobile device. Some of these devices may be further away from the mobile device 100 than undetected access points that are implemented at higher frequencies such as 60 GHz. Limiting measurements to access points operating at lower frequencies may, in some circumstances, lead to a less accurate location than one calculated utilizing measurements from access points detected after scanning multiple frequencies. For example, if the mobile device scans for a longer time period and scans a range of supported frequencies, including access points implemented at higher frequencies, such as 802.11ad access points implemented at 60 GHz, the mobile device can prioritize the closest detected access points, which, by reason of effective range, may include most or all of the access points detected at the highest frequencies such as 60 GHz and, if needed, some of the of the access points detected at the lower frequencies such as 2.4 GHz or 900 MHz. Where more access points are available than are needed, the access points may also be prioritized based on range, prioritizing the closest access points over the further access points. Range may be determined by signal strength (e.g., received signal strength indication—RSSI), for any given band, or by round trip time or observed time delay or by other means. In an embodiment, prioritization of access point measurements may be done by frequency band (for example, higher frequency band measurements may, in an embodiment, be prioritized over lower frequency band measurements because higher frequency bands typically have a shorter effective detection range and therefore may be received from relatively close access points), by estimated range (measurements from closer access points being prioritized over measurements from older access points as determined by signal strength, timing measurements such as RTT, TOA, OTD or other means), or by some combination thereof (for example, by using measurements taken of the signals from the closest access points in each frequency band).

In an embodiment, if an access point supports more than one frequency, one of the plurality of measurements may be chosen over the other(s) based estimated signal measurement reliability, closer estimated proximity, shorter elapsed time delay or other means. For example, if a first and second signal are received from the same access point, the one with the shorter distance estimate is likely the one less subject to multi-path and therefore the one that would be used. It is understood that signal strength may be subject to attenuation by wall penetration or other causes so that elapsed time may be a more reliable measure of the most direct path. It is also understood that various signal techniques such as signal peak analysis may be utilized to identify the shortest elapsed time and therefore, the most likely range.

Figure 1:
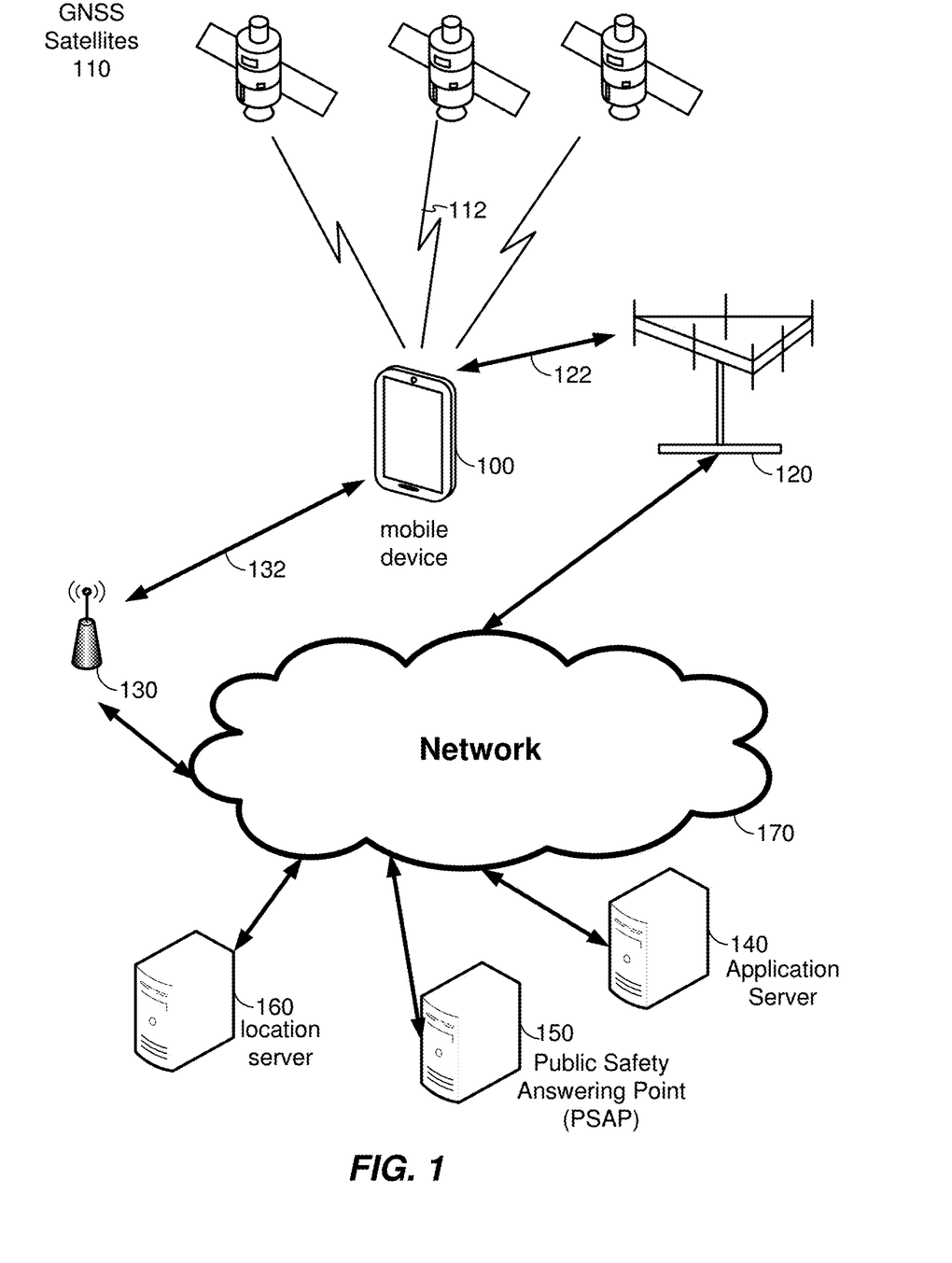
FIG. 1 is a system diagram including wireless-capable mobile devices, capable of receiving and measuring signal information from various signal sources.
Figure 2:
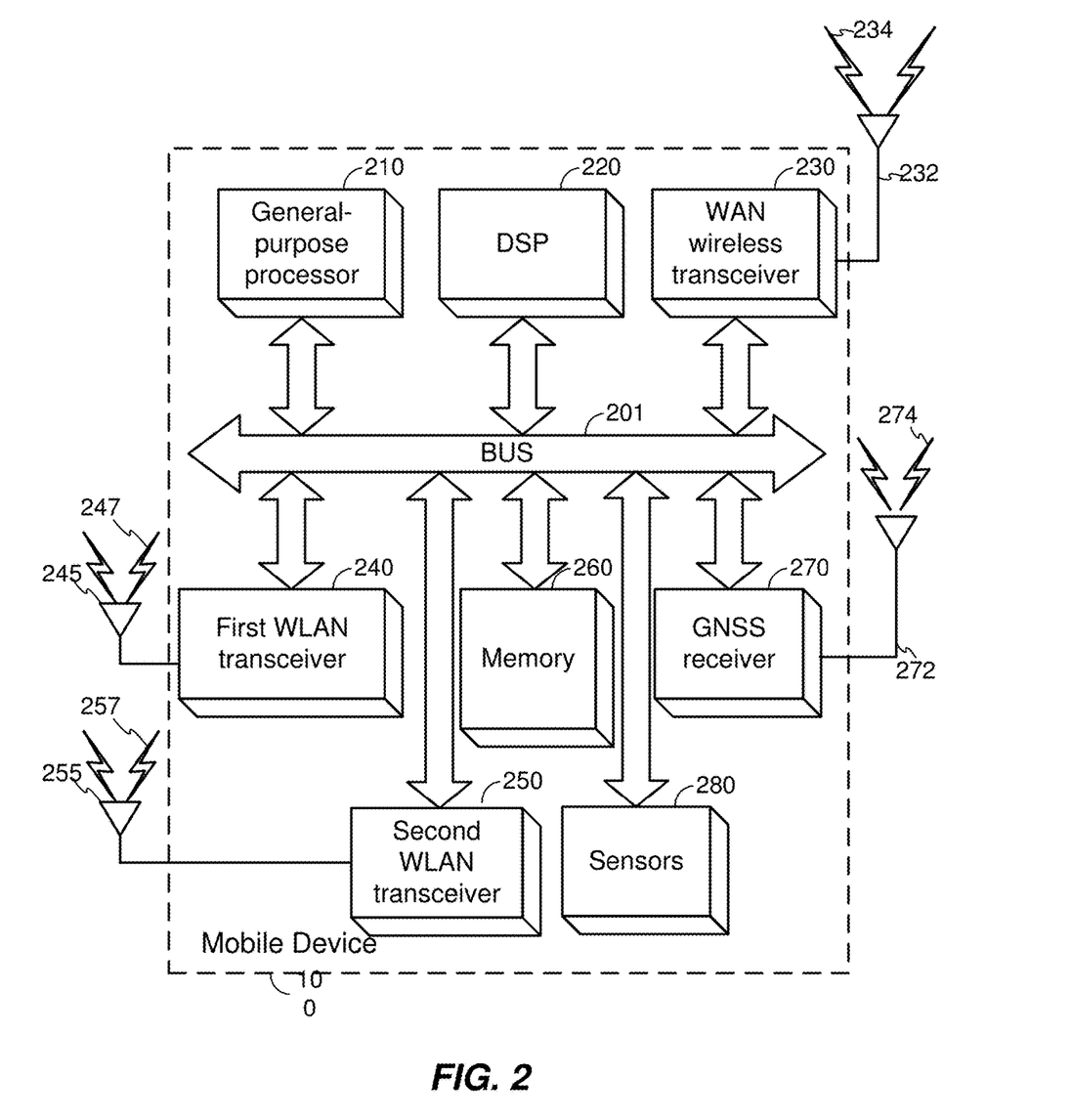
FIG. 2 is an exemplary mobile capable of receiving and measuring signal information from various signal sources.

FIG. 1 illustrates a system and means for implementing the various methods and techniques described in the figures and text herein. As shown in FIG. 2, in an embodiment, mobile device 100, which may also be referred to as a mobile device, or as a UE (or user equipment), may transmit radio signals to, and receive radio signals from, a wireless communication network. In one example, mobile device 100 may communicate, via wide area network (WAN) wireless transceiver 120 and wireless antenna 232 with a cellular communication network by transmitting wireless signals to, or receiving wireless signals from a WAN wireless transceiver 120 which may comprise a wireless base transceiver subsystem (BTS), a Node B or an evolved NodeB (eNodeB) or a next generation NodeB (gNodeB) or other WAN wireless transceiver 120 over wireless communication link 122. Similarly, mobile device 100 may transmit wireless signals to, or receive wireless signals from local transceiver 130 over wireless communication link 132, for example, by using first wireless local area network (WLAN) and/or personal area network (PAN) wireless transceiver 240 and antenna 245 and/or by using second wireless local area network (WLAN) and/or personal area network (PAN) wireless transceiver 250 and antenna 255. In an embodiment, the first WLAN transceiver may be tuned to a different frequency band or set of frequency bands then the second WLAN transceiver 250, through the use of different wireless front ends. In an embodiment, the first WLAN transceiver 240 and the second WLAN transceiver may support one or multiple adjacent or nearby frequency bands. In an embodiment, the first WLAN transceiver 240 may support a first frequency band (or bands) and the second WLAN transceiver 250 may support a second frequency band (or bands) wherein first frequency band or bands and the second frequency band or bands are widely separated from each other in frequencies.

In an embodiment, local transceiver 130 may be a WLAN access point, a Bluetooth transceiver, a ZigBee transceiver, or other WLAN or PAN transceiver. A local transceiver 130 and/or a WAN wireless transceiver 120 may comprise an access point (AP), femtocell, Home Base Station, small cell base station, Home Node B (HNB), Home eNodeB (HeNB), eNodeB or next generation NodeB (gNodeB) and may provide access to a wireless local area network (WLAN, e.g., IEEE 802.11 network), a wireless personal area network (PAN, e.g., Bluetooth® network) or a cellular network (e.g. an LTE network or other wireless wide area network such as those discussed in the next paragraph). Of course, it should be understood that these are merely examples of networks that may communicate with a mobile device over a wireless link, and claimed subject matter is not limited in this respect.

In an embodiment, GNSS signals 112 from GNSS Satellites 110 are utilized by mobile device 100 for location determination. In an embodiment, signals 122 from WAN transceiver(s) 120 and signals 132 from WLAN and/or PAN local transceivers 130 are used for location determination, alone or in combination with GNSS signals 112. In an embodiment, GNSS satellites may be from various global navigation satellite systems "GNSS" such as the Global Positioning system "GPS", the Russian GLONASS system, the European Union's Gallileo system and the Chinese BeiDou and BeiDou-2 systems) and/or combinations of GNSS.

Examples of network technologies that may support WAN wireless transceiver 230 and WAN wireless transceiver 120 include Global System for Mobile Communications (GSM), Code Division Multiple Access (CDMA), Wideband CDMA (WCDMA), Long Term Evolution (LTE), $5^{th}$ Generation Wireless (5G) or New Radio Access Technology (NR), and/or High Rate Packet Data (HRPD). GSM, WCDMA and LTE are technologies defined by 3GPP. CDMA and HRPD are technologies defined by the $3^{rd}$ Generation Partnership Project 2 (3GPP2). WCDMA is also part of the Universal Mobile Telecommunications System (UMTS) and may be supported by an HNB. WAN wireless transceivers 120 may comprise deployments of equipment providing subscriber access to a wireless telecommunication network for a service (e.g., under a service contract). Here, a WAN wireless transceiver 120 may perform functions of a wide area network (WAN) or cell base station in servicing subscriber devices within a cell determined based, at least in part, on a range at which the WAN wireless transceiver 120 is capable of providing access service. Examples of WAN base stations include GSM™, WCDMA™, LTE™, CDMA™, HRPD™, WiFi™, BT, WiMax™, and/or $5^{th}$ Generation (5G) base stations. In an embodiment, wireless LAN or PAN transceivers 240 and/or 250 may comprise a wireless LAN (WLAN) and/or PAN transceiver. In an embodiment, mobile device 100 may contain multiple wireless transceivers including WAN, WLAN and/or PAN transceivers. In an embodiment, the mobile device 100 may contain multiple wireless LAN (WLAN) transceivers, for example, first WLAN transceiver 240 and second WLAN transceiver 250. In an embodiment, radio technologies that may support wireless communication link or links (wireless transceiver 240) further comprise Wireless local area network (e.g., WLAN, e.g., IEEE 802.11), Bluetooth™ (BT) and/or ZigBee™ including various versions of these standards.

Figure 3:
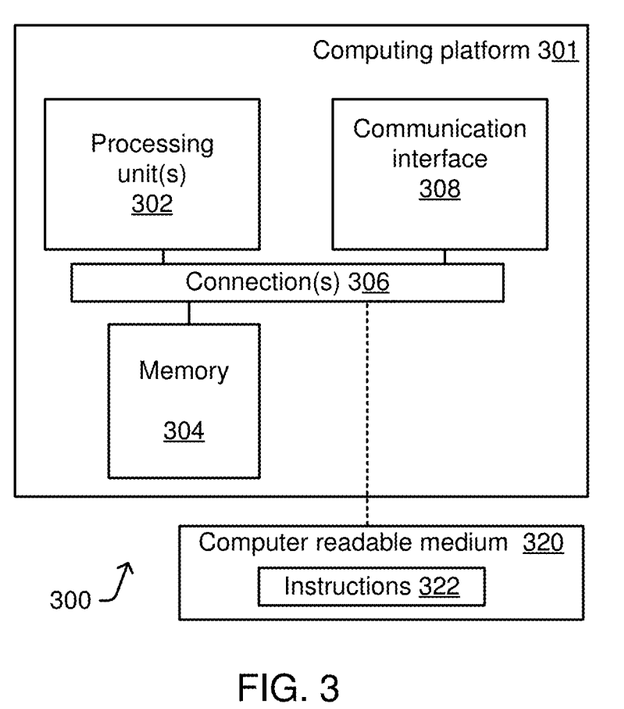
FIG. 3 is an exemplary network-based server, as may be used for a location server, a public safety answering point (PSAP), an application server or other network-based server.

In an embodiment, mobile device 100, using wireless transceiver(s) 230, 240 and/or 250, may communicate with application server 140, public safety answering point 150 and/or location sever 160 over a network 170 through communication interface(s) 308. In an embodiment, mobile device 100, using wireless transceivers 230, 240 and/or 250, may communicate with other servers over network 170 through communication interface(s) 308. Here, network 170 may comprise any combination of wired or wireless connections and may include WAN wireless transceiver 120 and/or local transceiver 130 and/or servers 140, 150 and/or 160 or other servers. In an embodiment, network 170 may comprise Internet Protocol (IP) or other infrastructure capable of facilitating communication between mobile device 100 and servers 140, 150 and/or 160 through local transceiver 130 or WAN wireless transceiver 120. In an embodiment, network 170 may comprise cellular communication network infrastructure such as, for example, a base station controller or packet based or circuit based switching center (not shown) to facilitate mobile cellular communication with mobile device 100. In an embodiment, network 170 may comprise local area network (LAN) elements such as Wi-Fi APs, routers and bridges and may in that case include or have links to gateway elements that provide access to wide area networks such as the Internet. In other implementations, network 170 may comprise a LAN and may or may not have access to a wide area network but may not provide any such access (if supported) to mobile device 100. In some implementations, network 170 may comprise multiple networks (e.g., one or more wireless networks and/or the Internet). In one implementation, network 170 may include one or more serving gateways or Packet Data Network gateways. In addition, one or more of servers 140, 150 and/or 160 may be a map server, a crowd source server, a location server and/or a navigation server.

In an embodiment, location server 160 may provide assistance data to mobile device 100 to enable or enhance the ability of mobile device 100 to determine its location. In an embodiment, location server 160 may determine the location of mobile device 100 based upon signals, photos, sensor input or other data obtained at the mobile device 100, including but not limited to signal measurements of signals transmitted by WAN transceivers 120 and/or WLAN and/or PAN transceivers 130, or may provide almanac or other assistance information describing the location, identification (such as MAC address and/or system, network and basestation IDs) and/or mode of WAN transceivers 120 and/or WLAN or PAN transceivers 130. In an embodiment, signally measurements may be sent from mobile device 100 to location server 160 utilizing proprietary or standardized messaging formats. In some embodiments, the messaging format will limit the total number of measurements sent to the location server to a maximum response count number of signal measurements or indications of signal measurements. In some embodiments, the location server 160 may specify how measurements are prioritized and/or which signal measurements are taken/measured and from which base stations and/or access points in messaging sent to mobile device 100. In other embodiments, mobile device 100 may determine how measurements are prioritized and/or which signal measurements are taken/measured and from which base stations and/or access points in messaging sent to the server. For example, in an embodiment the signal measurements could be prioritized based on proximity to the mobile device 100, such that the signal measurements from the closest access points and/or base stations are sent to the location server 160. For example, in an embodiment the signal measurements could be prioritized based on the strongest signals measured at the mobile device 100, such that the strongest signal measurements from access points and/or base stations are sent to the location server 160. In some embodiments, the signal measurements may be categorized by type such that WAN BTS measurements would be compared to other WAN BTS measurements and access point measurements are compared to other access point measurements. In some embodiments, access point measurements are grouped and/or prioritized by standard, for example 802.11ad, 802.11a/ac, 802.11b/g/n, 802.11ah and 802.11af, such that signals are prioritized within a given standards implementation. In some embodiments, access point measurements are grouped and/or prioritized by frequency such that signals are prioritized within a given frequency band. In some embodiments, access point measurement frequency bands and/or standards may be prioritized such that measurements taken at one or more frequencies are prioritized over measurements taken at one or more other frequencies and/or measurements from one or more standards are prioritized over measurements from one or more other standards. For example, measurements that have been taken at 60 GHz might be given priority over measurements taken at 2.4 GHz and 5 GHz. In some embodiments, a mixture of the above prioritization techniques might be applied. For example, the signals at 60 GHz and the strongest signals from 2.4 GHz and 5 GHz may be selected. In another embodiment, an estimate of range, for example, based on RSSI or RTT or elapsed time, may be utilized to calculate an approximate range from mobile device 100 to access points and/or base stations and signals from the closest access points and/or base stations may be prioritized. In some embodiments, base stations may be prioritized separately from access points or only access point measurements or only base station measurements may be sent or only the serving cell, in some embodiments, may be sent along with access point measurements. It is realized that these embodiments are not intended to be limiting and that other combinations may be utilized.

In an embodiment, location server 160 may provide GNSS acquisition assistance, ephemeris information and/or long-term orbital information and/or terrestrial transceiver locations, identifications and other terrestrial transceiver locations and/or may determine location based on GNSS and/or terrestrial transmitter signal measurements. In an embodiment, there may be multiple location servers 160. For example, one for long term ephemeris GNSS information and/or another for providing access point and/or base station almanac information and/or another for calculating locations based on terrestrial signal measurements such as access point and/or base station signal measurements. It is also understood that, where the term access point is utilized, Bluetooth measurements may also be utilized.

In an embodiment, an application server 140 may provide information to the mobile device such as weather, points of interest-related information, traffic, routing information and maps and/or other application information or may be utilized to gate access to the mobile device and/or may allow control of the mobile device such as through remote disable commands or by enabling or blocking access to particular types of information. In an embodiment, the application information may be based, at least in part, on one or more locations associated with the mobile device. In an embodiment, public safety answering point 150 may provide emergency support for a user of mobile device 100 such as emergency call connection for emergency calls from and emergency location of mobile device 100.

In various embodiments, and as discussed below, mobile device 100 may have circuitry and processing resources capable of obtaining location related measurements (e.g. for signals received from GPS, GNSS or other Satellite Positioning System (SPS) satellites 110, WAN wireless transceiver 120 or WLAN and/or PAN local transceiver 130 and possibly computing a position fix or estimated location of mobile device 100 based on these location related measurements. Location-related measurements may be time based such as time delay, observed time delay, relative time delay and round trip time (RTT) or may be based on signal strength such as received signal strength indication (RSSI) measurements. In some implementations, location related measurements obtained by mobile device 100 may be transferred to a location server such as an enhanced serving mobile location center (E-SMLC) or SUPL location platform (SLP) (e.g. location sever 160) after which the location server may estimate or determine a location for mobile device 100 based on the measurements. In the presently illustrated example, location related measurements obtained by mobile device 100 may include measurements of signals (112) received from satellites belonging to an SPS or Global Navigation Satellite System (GNSS) (110) such as GPS, GLONASS, Galileo or Beidou and/or may include measurements of signals (such as 122 and/or 132) received from terrestrial transmitters fixed at known locations (e.g., such as WAN wireless transceiver 120). Mobile device 100 or a location server 160 may then obtain a location estimate for mobile device 100 based on these location related measurements using any one of several position methods such as, for example, GNSS, Assisted GNSS (A-GNSS), Advanced Forward Link Trilateration (AFLT), Multilateration, Observed Time Difference of Arrival (OTDOA) or Enhanced Cell ID (E-CID), network triangulation/angle of arrival (AOA), network trilateration, Received Signal Strength Indication (RSSI) or combinations thereof. In some of these techniques (e.g. A-GNSS, AFLT, network trilateration and OTDOA, RSSI), pseudoranges, ranges or timing differences may be measured at mobile device 100 relative to three or more terrestrial transmitters at known locations or relative to four or more satellites with accurately known orbital data, or combinations thereof, based at least in part, on pilots, positioning reference signals (PRS) or other positioning related signals transmitted by the transmitters or satellites and received at mobile device 100. Here, servers 140, 150 or 160 may be capable of providing positioning assistance data, and/or control instructions (such as search window instructions) to mobile device 100 including, for example, information regarding signals to be measured (e.g., signal timing and/or signal strength), locations and identities of terrestrial transmitters (such as may be provided in a base station almanac), and/or signal, timing and orbital information for GNSS satellites or terrestrial network transceivers to facilitate positioning techniques such as A-GNSS, AFLT, OTDOA and E-CID. For example, servers 140, 150 or 160 or other servers may comprise an almanac which indicates locations and identities of wireless transceivers and/or local transceivers in a particular region or regions such as a particular venue, and may provide information descriptive of signals transmitted by a cellular base station or AP or mobile terrestrial transceiver such as transmission power and signal timing. In the case of E-CID, a mobile device 100 may obtain measurements of signal strengths for signals received from WAN wireless transceiver 120 and/or wireless local area network (WLAN) or PAN local transceiver 130 and/or may obtain a round trip signal propagation time (RTT) between mobile device 100 and a WAN wireless transceiver 120 or wireless local transceiver 130 (such as a WLAN access point or PAN/Bluetooth transceiver). A mobile device 100 may use these measurements together with assistance data (e.g. terrestrial almanac data such as a base station and/or access point almanac or GNSS satellite data such as GNSS Almanac and/or GNSS Ephemeris information) received from a location server 160 to determine a location for mobile device 100 or may transfer the measurements to a location server 160 to perform the same determination.

In various embodiments, location may be determined through various means, as described above. For example, in an embodiment, the mobile device 100 may determine its location with GNSS satellite signal measurements, with terrestrial transmitter signal measurements or some combination thereof. In an embodiment, the mobile device 100 may determine its location using 3D accelerometers and/or gyros to determine, via dead reckoning, distance and direction traveled from the last known position. In an embodiment, the mobile device 100 may determine its location using a combination of signals and sensors 280 such as various accelerometers and gyros such as 3D accelerometers, 3D gyros, magnetometers and pressure sensors; for example, a location may be determined using various signal measurements from GNSS and terrestrial transmitters and then updated using dead reckoning, altitude measurements or other sensor measurements. In an embodiment, for example, a location may be determined using a Kalman filter or other filter that combines various signal measurements from GNSS and terrestrial transmitters, inertial measurements using 3D or other accelerometers and/or 3D or other gyros, altitude measurements, magnetometer measurements or other sensor measurements. From a determined location, various signal measurements can be taken from visible transmitters to obtain an indication of distance of the transmitter from a determined location. The indication of distance may include signal strength or round-trip time or time of arrival or other distance estimation methods. New signal measurements may be taken at new determined locations. By combining indications of distance to any given transmitter taken from multiple locations, whether by one device or by a plurality of devices, the location of a transmitter, such as a WAN wireless transceiver 120 or WLAN or PAN local transceiver 130, may be determined. The location of the transmitter may be determined on mobile device 100 or on a crowd sourcing server or on a location server 160 or other network-based server.

A mobile device (e.g. mobile device 100 in FIG. 2) may be referred to as a device, a wireless device, a mobile terminal, a terminal, a mobile station (MS), a user equipment (UE), a SUPL Enabled Terminal (SET) or by some other name and may correspond to a cellphone, smartphone, laptop, tablet, PDA, tracking device, wearable device such as a watch, or some other portable or moveable device. Typically, though not necessarily, a mobile device may support wireless communication such as using GSM, WCDMA, LTE, CDMA, HRPD, Wi-Fi, Bluetooth (BT), WiMAX, Long Term Evolution (LTE), $5^{th}$ Generation Wireless (5G) or new radio access technology (NR), etc. A mobile device may also support wireless communication using a wireless LAN (WLAN), personal area network (PAN) such as Bluetooth™ or ZigBee, DSL or packet cable for example. A mobile device may comprise a single entity or may comprise multiple entities such as in a personal area network where a user may employ audio, video and/or data I/O devices and/or body sensors and/or wearables and a separate wireline or wireless modem. An estimate of a location of a mobile device (e.g., mobile device 100) may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level). Alternatively, a location of a mobile device may be expressed as a civic location (e.g., as a postal address or the designation of some point or small area in a building such as a particular room or floor) or as a reference to one or more base station or access point identifiers or a reference to an object at a known or predetermined location. A location of a mobile device may also be expressed as an area or volume (defined either geographically or in civic form) within which the mobile device is expected to be located with some probability or confidence level (e.g., 67% or 95%). A location of a mobile device may further be a relative location comprising, for example, a distance and direction or relative X, Y (and Z) coordinates defined relative to some origin at a known location which may be defined geographically or in civic terms or by reference to a point, area or volume indicated on a map, floor plan or building plan. In the description contained herein, the use of the term location may comprise any of these variants unless indicated otherwise.

FIG. 2 illustrates an embodiment of a mobile device, a non-limiting example for implementing the various methods and techniques illustrated in the figures and text herein. As shown in FIG. 2, in an embodiment, mobile device 100, which may also be referred to as a UE (or user equipment), may include one or more general-purpose processor(s) 210. The general-purpose processor 210 may sometimes be referred to by other names such as an applications processor, a general processor, a main processor or a processor. Various functionality may run on the general-purpose processor 210 such as applications, operating system functions and general mobile device functions. General-purpose processor 210 may also include multiple processors, in some embodiments including additional processors, that perform more specialized functionality, or parts thereof, such as processing related to camera sensors, video, audio and wireless signal processing such as wireless baseband processors. In an embodiment, mobile device 100 may also include a DSP 220, which may be used for various compute processing tasks such as video and graphical processing, image processing, facial identification, feature matching, scene matching, display management, GNSS signal processing, WAN signal processing, Wi-Fi signal processing and PAN signal processing. Some tasks may, in some embodiments, be split between the general-purpose processor and one or more DSPs such as location determination, where signal search, processing and correlation may happen at the DSP level while location determination may be calculated at the general-purpose processor 210.

In mobile device 100, wireless transceiver(s) such as WAN wireless transceiver 230, and WAN antenna 232, may support various wide area network (WAN) connections (e.g., Global System for Mobile Communications (GSM), Code Division Multiple Access (CDMA), Wideband CDMA (WCDMA), Long Term Evolution (LTE), $5^{th}$ Generation Wireless (5G) or new radio access technology (NR), High Rate Packet Data (HRPD)) or combinations thereof. Wireless transceiver(s) 230 may be implemented by multi-mode transceivers, discrete transceivers, separate or shared antennas (232) or various combinations thereof.

In mobile device 100, wireless transceiver(s) such as the first WLAN and/or PAN wireless transceiver 240, and WLAN and/or PAN antenna 245 and, in some embodiments, a second WLAN and/or PAN wireless transceiver 250, and WLAN and/or PAN antenna 255, may support various wireless local area network (WLAN) and personal area network (PAN) connections (e.g., wireless LAN connections (e.g., Wi-Fi/802.11) and personal area network (PAN) connections (e.g., Bluetooth and ZigBee), near field communication (NFC, sometimes known as contactless (CTLS) or CTLS NFC) or combinations thereof. Wireless transceiver(s) 240 may be implemented by multi-mode transceivers, discrete transceivers, separate or shared antennas (245) or various combinations thereof. In some embodiments, for mobile devices 100 with both a first WLAN transceiver 240 and a second WLAN transceiver, they may be utilized for different air interfaces or they may be utilized for the same or similar air interfaces implemented on different frequency bands, particularly if those frequency bands are widely separated. In some embodiments, the first WLAN transceiver 240 and/or the second WLAN transceiver 250 may support more than one frequency on the same transceiver, particularly where those frequencies are relatively close to each other. For example, in an embodiment, first WLAN transceiver 240 could be utilized to support both 2.4 GHz WiFi (such as 802.11b/g/n) and 5 GHz WiFi (such as 802.11a/ac) and a second WLAN transceiver may support a more distant band, such as 60 GHz (such as 802.11ad).

In some embodiments, the first WLAN transceiver 240 or the second WLAN transceiver might, instead, be a wireless personal area network (PAN) transceiver. In some embodiments, a wireless PAN transceiver may be co-located with a WLAN, GNSS or with a WAN transceiver or with other functionality.

Mobile device 100 may contain a GNSS receiver (270) and GNSS antenna 272. The GNSS receiver 270 may measure various signals 274 received from satellites belonging to an SPS or Global Navigation Satellite System (GNSS) such as GPS, GLONASS, Galileo and/or Beidou. These signal measurements may be utilized to determine location either alone or in combination with terrestrial signals such as WAN, WLAN and PAN signals.

Mobile device 100 may include various sensors which may, in some embodiments be discrete or in some embodiments, be integrated into a sensor subsystem. Sensors may include, in various embodiments, accelerometers such as 3D accelerometers, gyros such as 3D gyros, pressure sensors, light and/or camera sensors, light sensors and magnetometers, often used alone or in combination to determine dead reckoning output such as heading, distance, and orientation (such as, for example, using an inertial management unit (IMU)). Sensors may be used, in an embodiment to determine velocity or speed and acceleration or rotation or orientation and/or used to determine step count and gait. Other sensors, in an embodiment, may include camera sensors, light sensors, and pressure sensors or other altimeters or other sensor types such as medical and chemical sensors.

Mobile device 100 may include a display (not shown). In some embodiments, the display may be a touchscreen capable of both displaying visual output and receiving touch, fingerprint, ultrasonic or other input. The display be associated with a virtual keyboard on the display, sometimes on demand, or by an actual keyboard, for character input. Mobile device 100 may also include memory 260, which may comprise FLASH, RAM, ROM, disc drive, or FLASH card or other memory devices or various combinations thereof. In an embodiment, memory 260 may contain instructions to implement various methods described throughout this description. In an embodiment, memory 260 may contain instructions for interfacing with a location server 160, such as to request/receive a location or to send, to the location server 160, signal measurements or ranges such as those from GNSS satellites and terrestrial transceivers such as WLAN, WAN and PAN transceivers. In an embodiment, memory 260 may contain instructions for interfacing with a public safety answering point (PSAP) 150 and/or application server 140.

FIG. 3 illustrates a server as a non-limiting example of means for implementing the methods and techniques described herein. Referring to FIG. 3, in an embodiment, the servers 140, 150 and 160 and other network based servers, may use the computing platform 301 embodiment of FIG. 3. The computing platform may comprise one or more processors, here, processing unit(s) 302 comprising one or more general purpose processors, special processors such as graphics processors and/or communications processors or baseband processors. Computing platform 301 will include at least one communication interface 308 to send communications over network 170. The communication interface 308 may comprise a network interface card or cards or other interface for interfacing to an Intranet and/or Internet over network 170 such as those based on Ethernet and/or TCP/IP. Communication interface 308 may also comprise, in some embodiments, a wireless interface or interfaces such as WAN, WLAN and Bluetooth wireless interfaces. The computing platform may also comprise various memory (304), such as Cache, RAM, ROM, disc, and FLASH memory. In an embodiment, Computing platform 301 may also access computer readable medium 320 such as hard disk drives, tape drives, flash drives and other memory devices. In an embodiment, memory 304 may contain instructions for interfacing with a mobile device 100, such as to determine a location or to receive, from the mobile device 100, signal measurements or ranges such as those from GNSS satellites and terrestrial transceivers such as WLAN, WAN and PAN transceivers. In an embodiment, memory 304 may contain instructions for providing services and information to mobile devices 100.

Figure 4:
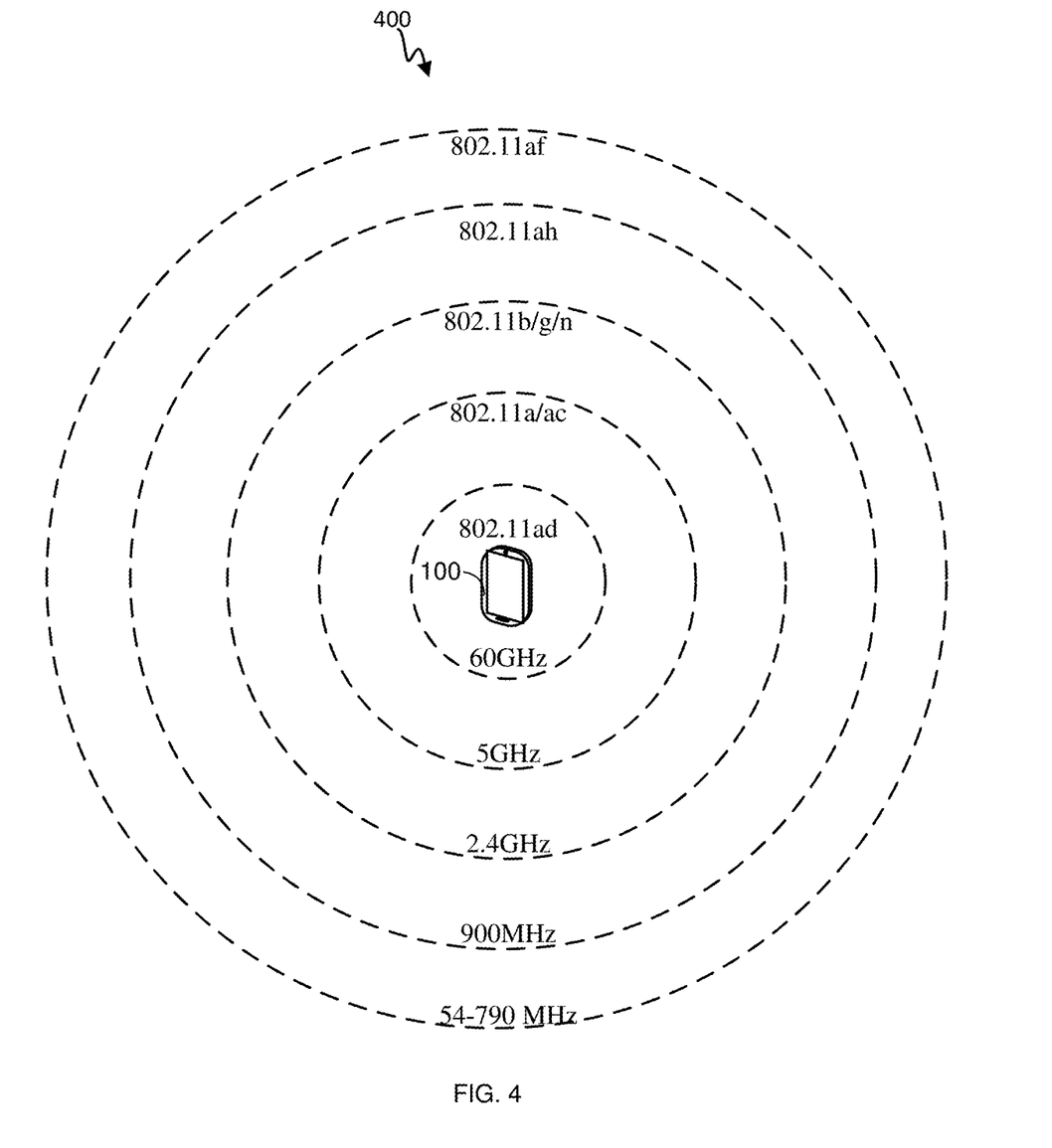
FIG. 4 illustrates various 802.11 technologies and associated wireless LAN frequency bands and ranges

In FIG. 4, diagram 400 illustrates various 802.11 wireless LAN standard versions, their associated frequency bands and their relative range. It is understood that various means may be utilized in mobile device 100 to receive and process signals corresponding to the various 802.11 standard versions. It is also understood that the list of standard versions in FIG. 4, may not include all current or future standard versions for 802.11.

In an embodiment, Wireless LAN access points are frequently utilized for location determination. Wireless LAN access points may be detected by scanning frequency bands supported on the mobile device 100 for the applicable technologies; for example, in FIG. 4, we find 802.11ad implemented at 60 GHz, 802.11a and 802.11ac at 5 GHz, 802.11b, 802.11g and 802.11n implemented at 2.6 GHz, 802.11ah implemented at 900 MHz, and 802.11af implemented at 54-790 MHz. In an embodiment, as the frequency a technology is implemented in decreases, the effective communication and detection range increases and vice versa. In some embodiments, as the frequency a technology is implemented in increases, the time required to scan that frequency band may also increase. Thus, 802.11ad, implemented at 60 GHz, may take longer to scan for access points than at 802.11af at 57-790 MHz.

Figure 5:
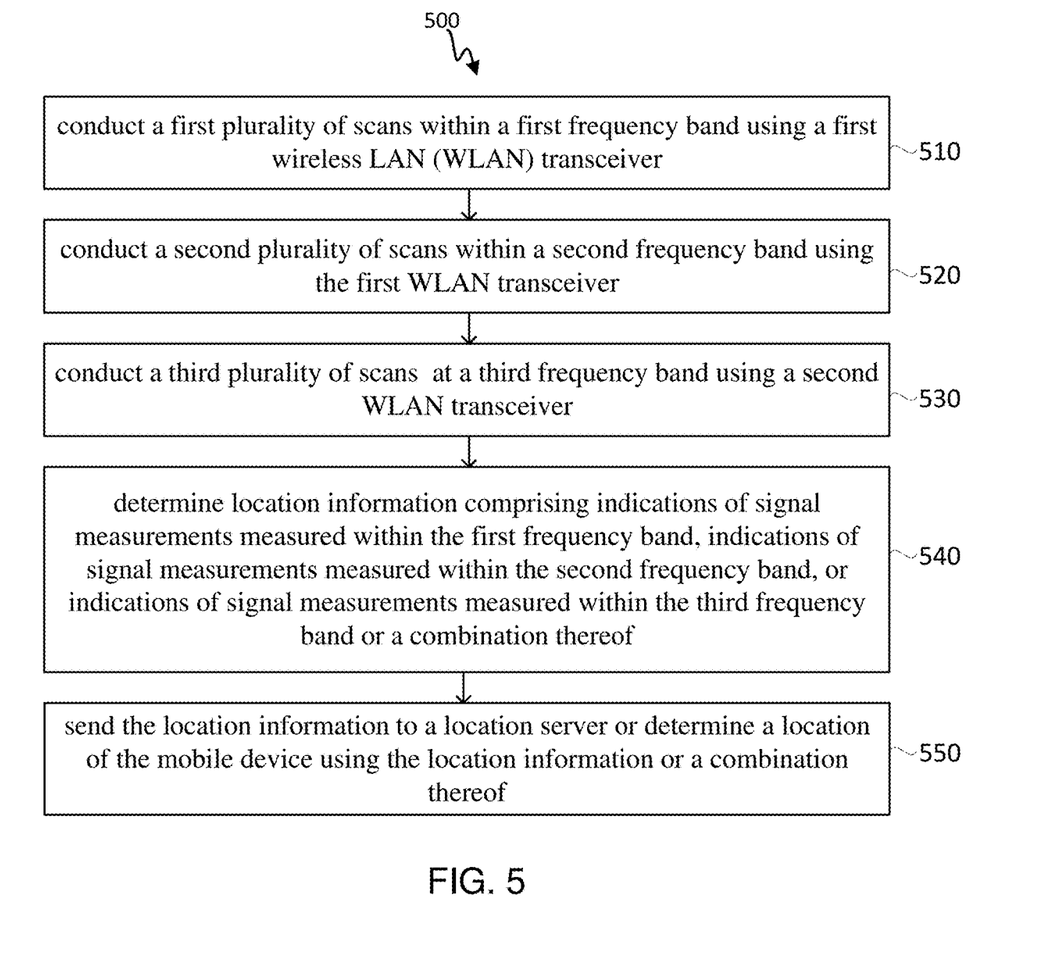
FIG. 5 illustrates an exemplary technique for scanning across multiple wireless LAN (WLAN) frequency bands.

FIG. 5 illustrates a method and technique 500, on a mobile device 100, for determining signal measurements on a plurality of frequencies at a mobile device. In an embodiment, mobile device 100 may utilize a first WLAN transceiver 240 for lower frequencies such as 2.4 GHz, 5 GHz, 900 MHz, and/or 54-790 MHz. In an embodiment, mobile device 100 may utilize a second WLAN transceiver 250 for higher frequencies such as 60 GHz. In an embodiment, a single transceiver may be utilized for some or all frequencies, utilizing a switch or a diplexer or multiplexer to separate RF front ends from the transceiver. In an embodiment, digital sampling may be used to utilize one or more transceivers across multiple frequencies. In an embodiment, active scanning or passive scanning or a combination thereof may be used. In an embodiment, active scans may be utilized with null SSID names. In an embodiment, active scans may utilize a base station almanac or other list of access points containing location, transceiver ID information, and in some embodiments, associated frequency bands and/or channels, which may be utilized to target scans, including active or passive scans, using SSID, MAC address, or other identification information to scan for specific access points. In some embodiments, scans may be conducted across multiple frequency bands and channels and the detected access points or other transceivers matched against transceivers in the base station almanac to be used to calculate location of the mobile device, or sent to a location server 160 or application server 140 so that a location may be calculated on the location server 160 or application server 140.

In an embodiment, in step 510, the mobile device 100 may conduct a first plurality of scans within a first frequency band using a first transceiver in the mobile device. In an embodiment, the first frequency band may contain multiple channels, wherein a plurality of channels within the first frequency band are scanned. In an embodiment, the mobile device 100, in step 520, may conduct a second plurality of scans within a second frequency band using the first transceiver in the mobile device. In an embodiment, the first frequency and the second frequency may be simultaneously received and split in baseband or they may be filtered in analog and processed separately and/or in parallel. In an embodiment, the first frequency may be at 2.4 GHz and the second frequency may be 5 GHz. In an embodiment, the first and second frequency may be any of 2.4 GHz, 5 GHz, 900 MHz, or 54-790 MHz or other frequencies less than 10 GHz. In an embodiment the first and second frequency may be any two frequencies with 5 GHz or less separation between them. In an embodiment, the mobile device 100, in step 530, may conduct a third plurality of scans within a third frequency band using a second transceiver in the mobile device. In an embodiment, the third frequency may be significantly higher than the first and second frequency. In an embodiment, the third frequency may be at 60 GHz. In an embodiment, the third frequency may be any frequency above 10 HGz. In an embodiment, the third frequency band may contain more channels than the first frequency band and/or the second frequency band. In an embodiment, the third frequency band may take longer to scan than the first frequency band and/or the second frequency band. In an embodiment, scans at higher frequencies may take longer than scans at lower frequencies. In an embodiment, the first scan is at 2.4 GHz, the second scan is at 5 GHz and the third scan is at 60 GHz. In an embodiment, the first and second scans are at any of 2.4 GHz, 5 GHz, 900 MHz, or 54-790 MHz or other frequencies less than 10 GHz. In an embodiment the first and second frequency may be any two frequencies with 5 GHz or less separation between them. In an embodiment, the third scan may be at a frequency significantly higher than the first and second frequency. In an embodiment, the third scan may be conducted at 60 GHz. In an embodiment, the third scan may be conducted at any frequency above 10 HGz.

In an embodiment, mobile device 100, in step 540, may determine location information comprising indications of signal measurements measured within the first frequency band, indications of signal measurements measured within the second frequency band, or indications of signal measurements measured within the third frequency band, or a combination thereof. In an embodiment, the signal measurements may be signal strength measurements such as RSSI measurements. In an embodiment the signal measurements may be timing measurements such as RTT, OTDOA, TOA or other time-related measurements. In an embodiment, the location information comprises signal measurements. In an embodiment, the location information comprises transceiver identification information such as MAC address and/or frequency band and/or channel information, associated with the signal measurements. In an embodiment, the location information may comprise range estimates associated with transceiver identification information. In an embodiment, the location information may be prioritized or ordered by frequency band and/or channel of the measured signal, by estimated range between the mobile device 100 and the access point or WLAN transceiver, by signal strength of the measured signal, by elapsed time of the measured signal or by other signal related parameters or some combination thereof.

In an embodiment, in step 550, the mobile device may send the location information, from the mobile device to a location server, or determine a location of the mobile device using the location information or a combination thereof. In an embodiment where the location information is sent to the location server, the location information sent to the location server 160 may be a subset of the total measurements measured at the mobile device. In an embodiment, where the location information is sent to the location server, location information may be prioritized or ordered by frequency band and/or channel of the measured signal, by estimated range between the mobile device 100 and the access point or WLAN transceiver, by signal strength of the measured signal, by elapsed time of the measured signal or by other signal related parameters or some combination thereof, wherein the measurements associated with access points or other transceivers at the shortest/smallest ranges are sent to the location server while, if there are more than a prespecified maximum response count number of ranges and/or measurements to be sent, the shortest ranges or the measurements associated with the shortest ranges are sent to a location server or utilized by the mobile device to determine location. In an embodiment, the number of measurements sent to the location server 160 are limited to a maximum response count number of measurements. In an embodiment, the highest frequency band signal measurements are prioritized over signal measurements taken at lower frequency bands. In an embodiment, signals from the closest access points or other terrestrial transceivers are prioritized. In an embodiment, a mix of the measurements in the highest frequency signal band(s) and signals from the closest access points (based on, for example, the strongest signal strength or the shortest elapsed time delay between the transceiver and the mobile device) are prioritized for sending to the location server 160 or application server 140 or to be utilized for location calculations. In an embodiment, if there are less than the maximum response count number of measurements at the highest frequency band, lower frequency band measurements are also sent so that the maximum response count number of measurements is set to the location server 160. In an embodiment, if there are more signal measurements, when including signal measurements from all scanned frequency bands, than the maximum response count number of measurements (or indications of measurements), the maximum response count number of measurements (or other indications of measurements) is sent. In an embodiment, if there are more than the maximum response count number of measurements at the highest frequency, only signals measured at the highest frequency are sent. In an embodiment, if there are no measurements completed at the highest frequency, only signals measured at the lower frequencies are sent. One skilled in the art would realize that various combinations of the above described techniques may also be utilized.

In an embodiment, in step 550, where the mobile device 100 uses the signal measurements to determine a location of the mobile device using the location information, the mobile device may use the signal measurements to determine its location. In an embodiment, the higher frequency band measurements and/or measurements from the closest WLAN or other transceivers are weighted more heavily or are utilized in lieu of measurements from further WLAN transceivers or measurements from lower frequency band transceivers. In an embodiment, the mobile device may use trilateration using three of more signal measurements to determine its location. In an embodiment, the mobile device may use the location of the closest access point for its location and the distance to the closest access point as the uncertainty of its location. In an embodiment, the mobile device prioritizes measurements made at higher frequency bands measurements over measurements made at lower frequency bands in determining its location. In an embodiment, the mobile device weights measurements made at higher frequency bands measurements higher than measurements made at lower frequency bands in determining its location in calculating its location. In an embodiment, the mobile device weights signal measurements from closer transceivers (such as WLAN, WAN and Bluetooth transceivers) over signal measurements made from farther transceivers when calculating its location. In an embodiment, the mobile device weights measurements associated with transceivers (WLAN, WAN and/or Bluetooth) with associated higher confidence location estimates higher than measurements associated with transceivers with lower confidence location estimates. In an embodiment, the mobile device uses signal measurements from transceivers with a strong SSID and ignores transceivers with a weak or low SSID, relative to the expected SSID for a given frequency band and standard specification; typically, this would be based on the signals showing the least loss when compared to the specified transmission power for a given standard and frequency band being prioritized for use or weighted heavier when calculating location of the mobile device 100.

In an embodiment, the location information comprises indications of signal measurements from maximum response count or fewer access points. In an embodiment, a maximum response count may be specified by the server, determined by the mobile device 100 dynamically or pre-configured, or specified by a standard that specifies communication formats and requirements for messaging between a location server 160 and a mobile device 100 such as via 3GPP LTE positioning protocol (LPP) or Open Mobile Alliance (OMA) user plane location protocol (ULP).

In an embodiment, the mobile device: transmits at least one probe request within a first frequency band using a first transceiver in the mobile device; transmits at least one probe request within a second frequency band using the first transceiver in the mobile device; and transmits at least one probe request within a third frequency band using a second transceiver in the mobile device. In an embodiment, a null SSID probe request may be transmitted at each channel within a frequency band or transmitted at some subset of channels within a frequency band. In an embodiment, targeted probe requests may be sent, specifying particular SSID or other identification (MAC address) on specified frequency bands in specified channels; in an embodiment, the identification, frequency band and channel information may be provided to the mobile device from a location server in a base station almanac. In an embodiment, the base station almanac may include transceiver (WAN, WLAN and/or Bluetooth or other transceivers) type, identification, frequency band, channel and/or location information, and may be provided by a location server or by an almanac server or other network server device.

In an embodiment, the location information comprises all indications of signal measurements in the third frequency band or of maximum response count indications of signal measurements in the third frequency band. In an embodiment where the third frequency band (e.g., the highest frequency measurements) are prioritized, for example, because they have the shortest range and are therefore likely to be from the closest access points or transceivers, all signal measurements from the third frequency band would be included before including signal measurements from other lower frequency bands. This would be most useful if the detection and/or response range for that frequency band, e.g. 60 GHz, was particularly short, such that any probe responses in that band would be from transceivers that were closes to the mobile device 100 than transceivers measured in lower frequency bands.

In an embodiment, the indications of signal measurements measured within the third frequency band are included in the sent location information instead of some or all of the indications of signal measurements measured within the first frequency band or some or all of the indications of signal measurements measured within the second frequency band or instead of some or all of the indications of signal measurements at measured within both the first frequency band and the second frequency band. Signal measurements made in lower frequency bands are often more likely to be available and may be measured in considerably less time than probe responses from higher frequency bands. However, probe responses from higher frequency bands are more likely to be from transceivers that are near to the mobile device. In such a situation, particularly if maximum response count measurements are already available from transceivers that transmit in lower frequency bands, measurements from the higher frequency band (here, the third frequency band) may be used to replace measurements from lower frequency bands, as the higher frequency band signal measurements become available. This process would be subject to a maximum time for response, sometimes sent by the location server 160 (sometimes sent as a quality of service parameter (QOS parameter), such that a very short maximum time for response (such that a scan could not be completed at the higher frequency band) would result in signal measurements only from lower frequency bands or, at least, may result in fewer measurements from the higher frequency band.

In an embodiment, the indications of signal measurements measured within the third frequency band are utilized to determine the location of the mobile device instead of the indications of signal measurements measured within the first frequency band and the indications of signal measurements measured within the second frequency band. The assumption being that the higher frequency band measurements are from closer access points or other transceivers than the lower frequency band measurements. To the extent that enough higher frequency band signal measurements are available, a location may be calculated using only higher frequency band measurements. More likely, a combination of signal measurements from the closest lower frequency band transceivers and/or access points and measurements from the higher frequency band access points and/or transceivers would be utilized. If the location is calculated on the mobile device 100, for example, utilizing a base station almanac for access point and/or transceiver location and identification information, varying numbers and geometries of access points/transceivers may be utilized to optimize access point/transceiver geometry/DOP (dilution of precision) and to minimize location uncertainty.

In an embodiment, the indications of signal measurements comprise indications of time of arrival or indications of signal strength, and wherein each indication of the indications of signal measurements is associated with an access point identifier. In an embodiment, a combined duration of the first plurality of scans and the second plurality of scans does not exceed a maximum response time and the duration of the third plurality of scans exceeds the maximum response time. For example, the lower frequency band scans, here the first plurality of scans and the second plurality of scans may be very quick while the scans within the higher frequency band, here the third plurality of scans, may take considerably longer to complete. If the server maximum response time or quality of service parameter (QoS) dictates a maximum response time that is too short to complete a plurality of scans at the higher frequency band, fewer or no measurements may be available from the higher frequency band, which may impact the accuracy or uncertainty associated with a location determined using the results. In some embodiments, the maximum response time is sent as a Quality of Service (QoS) parameter. It is understood that other labels may be used for a maximum response time variable.

In an embodiment, the duration of the first plurality of scans and the duration of the second plurality of scans are less than or equal to the duration of the third plurality of scans. This is likely to be the case where the first and second plurality of scans are conducted at significantly lower frequency bands than the third frequency band. In an embodiment, the first frequency band is lower than the second frequency band and the second frequency is lower than the third frequency band. Also, where the first frequency band and the second frequency band are relatively close, they may be received at the same transceiver, for example, the first transceiver. In an embodiment, for example where two transceivers are used, the first plurality of scans and the second plurality of scans may be conducted concurrent with at least part of the third plurality of scans. In such an embodiment, the first transceiver may tune first to the first frequency band and then to the second frequency band while the second transceiver tunes to the third frequency band.

Also, in an embodiment, particularly in one where location or ranges are calculated on the mobile device, the location server 160 or other server, such as an almanac server, may send a base station almanac to mobile device 100 such that the mobile device 100 receives an almanac of access points or WAN base stations or PAN transceivers or some combination thereof from a location server or from an almanac server. In an embodiment, determining the location of the mobile device may comprise determining the location of the mobile device based, at least in part, on the location information and the almanac of access points.

Reference throughout this specification to "one example", "an example", "certain examples", "in an embodiment", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or "in an embodiment" or other like phrases in various places throughout this specification are not necessarily all referring to the same feature, example, and/or limitation. Furthermore, the particular features, structures, or characteristics may be combined or modified in one or more examples and/or features and across various embodiments. The specified embodiments are not intended to be limiting relative to implementations, which may vary in detail; one skilled in the art will realize that other non-specified embodiments may also be used with or to modify the described embodiments.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WAN"), a wireless local area network ("WLAN"), a wireless personal area network (PAN), and so on. The term "network" and "system" may be used interchangeably herein. A WAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, Long Term Evolution ("LTE"), Fifth Generation ("5G") or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). CDMA2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a PAN may comprise a Bluetooth network, an IEEE 802.15x, comprising a Zigbee network, for example. Wireless communication implementations described herein may also be used in connection with any combination of WAN, WLAN or PAN.

In another aspect, as previously mentioned, a wireless transmitter or access point may comprise a wireless transceiver device, utilized to extend cellular telephone service into a business or home. In such an implementation, one or more mobile devices may communicate with a wireless transceiver device via a code division multiple access ("CDMA") cellular communication protocol, for example.

Techniques described herein may be used with a satellite positioning system ("SPS") that includes any one of several global navigation satellite systems ("GNSS" such as the Global Positioning system "GPS", the Russian GLONASS system and the European Union's Gallileo system and the Chinese BeiDou and BeiDou-2 systems) and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, FLASH, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A method of determining signal measurements on a plurality of frequencies at a mobile device, comprising:
   conducting a first plurality of scans within a first frequency band;
   conducting a second plurality of scans within a second frequency band, wherein the second frequency band is higher than the first frequency band;
   determining location information comprising first indications of signal measurements measured within the first frequency band and second indications of signal measurements measured within the second frequency band; and
   sending a portion or all of the first and second indications of signal measurements up to a maximum response count of indications of signal measurements, from the mobile device to a location server, wherein, in response to a total number of the first and second indications of signal measurements exceeding the maximum response count, the portion of the first and second indications of signal measurements being sent is selected based, at least in part, upon indications of signal measurements measured in a higher frequency band having a higher priority than indications of signal measurements measured in a lower frequency band.

2. The method of claim 1, wherein the portion or all of the first and second indications of signal measurements being sent comprises indications of time of arrival or indications of signal strength or indications of frequency band or a combination thereof.

3. The method of claim 1, wherein the first plurality of scans and the second plurality of scans are conducted by a shared transceiver.

4. The method of claim 1, wherein the first plurality of scans and the second plurality of scans are conducted by different transceivers.

5. The method of claim 1, wherein the first plurality of scans and the second plurality of scans are conducted in a same air interface.

6. The method of claim 1, wherein the first plurality of scans and the second plurality of scans are conducted in different air interfaces.

7. A mobile device for determining signal measurements on a plurality of frequencies, comprising:
   one or more transceivers; and
   a processor, communicatively connected to the one or more transceivers, wherein the processor is configured to:
      conduct a first plurality of scans within a first frequency band;
      conduct a second plurality of scans within a second frequency band, wherein the second frequency band is higher than the first frequency band;
      determine location information comprising first indications of signal measurements measured within the first frequency band and second indications of signal measurements measured within the second frequency band; and
      send a portion or all of the first and second indications of signal measurements up to a maximum response count of indications of signal measurements, from the mobile device to a location server, wherein, in response to a total number of the first and second indications of signal measurements exceeding the maximum response count, the portion of the first and second indications of signal measurements being sent is selected based, at least in part, upon indications of signal measurements measured in a higher frequency band having a higher priority than indications of signal measurements measured in a lower frequency band.

8. The mobile device of claim 7, wherein the portion or all of the first and second indications of signal measurements being sent comprises indications of time of arrival or indications of signal strength or indications of frequency band or a combination thereof.

9. The mobile device of claim 7, wherein the first plurality of scans and the second plurality of scans are conducted by a shared transceiver.

10. The mobile device of claim 7, wherein the first plurality of scans and the second plurality of scans are conducted by different transceivers.

11. The mobile device of claim 7, wherein the first plurality of scans and the second plurality of scans are conducted in a same air interface.

12. The mobile device of claim 7, wherein the first plurality of scans and the second plurality of scans are conducted in different air interfaces.

13. A non-transitory computer-readable medium, having stored thereon computer-readable instructions to cause a processor to:
   conduct a first plurality of scans within a first frequency band;
   conduct a second plurality of scans within a second frequency band, wherein the second frequency band is higher than the first frequency band;
   determine location information comprising first indications of signal measurements measured within the first frequency band and second indications of signal measurements measured within the second frequency band; and
   send a portion or all of the first and second indications of signal measurements up to a maximum response count of indications of signal measurements, from a mobile device to a location server, wherein, in response to a total number of the first and second indications of signal measurements exceeding the maximum response count, the portion of the first and second indications of signal measurements being sent is selected based, at least in part, upon indications of signal measurements measured in a higher frequency band having a higher priority than indications of signal measurements measured in a lower frequency band.

14. The non-transitory computer-readable medium of claim 13, wherein the portion or all of the first and second indications of signal measurements being sent comprises indications of time of arrival or indications of signal strength or indications of frequency band or a combination thereof.

15. A mobile device for determining signal measurements in a plurality of frequency bands, comprising:
  means for conducting a first plurality of scans within a first frequency band;
  means for conducting a second plurality of scans within a second frequency band, wherein the second frequency band is higher than the first frequency band;
  means for determining location information comprising first indications of signal measurements measured within the first frequency band and second indications of signal measurements measured within the second frequency band; and
  means for sending a portion or all of the first and second indications of signal measurements up to a maximum response count of indications of signal measurements, from the mobile device to a location server, wherein, in response to a total number of the first and second indications of signal measurements exceeding the maximum response count, the portion of the first and second indications of signal measurements being sent is selected based, at least in part, upon indications of signal measurements measured in a higher frequency band having a higher priority than indications of signal measurements measured in a lower frequency band.

16. The mobile device of claim 15, wherein the portion or all of the first and second indications of signal measurements being sent comprises indications of time of arrival or indications of signal strength or indications of frequency band or a combination thereof.

\* \* \* \* \*